United States Patent [19]

Connell

[11] 3,711,651

[45] Jan. 16, 1973

[54] POLARITY SEPARATION MULTIPLEX

[76] Inventor: Raymond S. Connell, 200 Cardamon Drive, Edgewater, Md. 21037

[22] Filed: Dec. 30, 1970

[21] Appl. No.: 102,594

[52] U.S. Cl. ..................................179/15 BT, 179/82

[51] Int. Cl. ..................................................H04j 7/02

[58] Field of Search.....179/82, 15 BT; 325/352, 361; 340/53, 158, 160, 26; 180/98

[56] References Cited

UNITED STATES PATENTS

| | | | |
|---|---|---|---|
| R25,699 | 12/1964 | Kidd | 179/15 BT |
| 2,721,896 | 10/1955 | Foot | 179/82 |
| 3,198,279 | 8/1965 | Quinn | 180/98 |
| 3,614,990 | 10/1971 | Schnitzler | 180/98 |
| 3,029,893 | 4/1962 | Mountjoy | 179/82 |
| 3,085,646 | 4/1963 | Paufue | 340/53 |
| 3,369,078 | 2/1968 | Stradley | 179/15 BT |
| 1,777,433 | 10/1930 | Hale | 179/82 |
| 2,883,523 | 4/1959 | Meserow | 325/361 |
| 2,336,276 | 12/1943 | van der Meulen | 179/15 BT |
| 2,765,373 | 10/1956 | Smith | 325/361 |

*Primary Examiner*—Kathleen H. Claffy
*Assistant Examiner*—David L. Stewart
*Attorney*—Stevens, Davis, Miller & Mosher

[57] ABSTRACT

A method and apparatus for the transmission and reception of signals in separate communication channels by imposing modulation upon only that portion of a transmission carrier wave which lies above the average value, or only upon that portion which lies below the average value, or upon both portions independently but simultaneously, and then demodulating the two halves of the resulting signal envelope separately at the receiving end. The result of this technique is the creation of two channels selectable by polarity only. Transmission of the signal envelope from the transmitter to the receiver is accomplished by induction. Since the signal envelope is polarity modulated, the separate signal pulses may be amplitude and width modulated for transmission of complex information. Additional channels can, of course, be produced by combining the two basic channels.

17 Claims, 6 Drawing Figures

INVENTOR
RAYMOND S. CONNELL

BY Stevens, Davis, Miller & Mosher
ATTORNEYS

INVENTOR
RAYMOND S. CONNELL

BY Stevens, Davis, Miller & Mosher
ATTORNEYS

INVENTOR
RAYMOND S. CONNELL

BY Stevens, Davis, Miller & Mosher
ATTORNEYS

POLARITY SEPARATION MULTIPLEX

The present invention relates to a technique for transmitting and receiving modulated pulses for a wide variety of uses and involves substantially the same equipment for each use. The transmitting and receiving equipment used to practice this technique is extremely simple, compact and economic to produce.

The present invention comprises a pulse system in which negative-going pulses and positive-going pulses of current in a conductor can be modulated independently with different information thus creating two polarity multiplexed channels. Coupling between a transmitter and a receiver is accomplished by means of the magnetic field created by the pulses of current in the conductor. Either of the multiplexed channels can be selected by a single receiver merely by moving the receiver from one side of the conductor to the other. The channel received at any instant positively identifies the position of the receiver with respect to the conductor, thereby eliminating the need for phase comparison circuits or filters, for a positive guidance and control system. The same positive selection between two channels, on a basis of the physical location with respect to a conductor, provides the basis for a multitude of other uses, such as restricting reception of a channel to a sharply defined area, or stereo reception using two identical receivers within a loop formed by the conductor carrying the modulated pulses. Channels are separated for stereo reception by reversing the connections to the pick-up coil in one receiver.

The basic concept of the creation of two multiplexed channels on one carrier by separately modulating the negative and positive polarities of a periodic wave is not new, for instance see U.S. Pat. No. 1,914,570 to C. F. Jenkins. Nor is the use of magnetic induction for short range communications and guidance original with the present inventor, see for example U.S. Pat. No. 3,009,525 to De Liban. The combination of the two principles in the manner described herein produces unique and useful results which have not been anticipated by the known prior art on either principle.

One beneficial result of the present invention is a great simplification of the equipment required for guidance. A simple receiver produces a unique "right of cable", or "left of cable", output which can be interpreted aurally by a person for manual guidance, or electronically for automatic control of a vehicle. The use of a pulse train for the carrier, instead of a sine wave, is an innovation which eliminates cross-talk between channels and makes polarity modulation practical for the first time with simple equipment. Others have recognized the inherent limitation of polarity modulation due to cross-talk and sought to eliminate it by various complex methods, such as the method disclosed in U.S. Pat. No. 2,907,830 to Boutry. The infinite clipping possible with width modulated pulses, as disclosed herein provides a simple and effective solution to this problem.

It should therefore be noted that the present invention is adapted for use in a wide variety of applications, such as for cordless headset stereo reproduction. The left and right channel audio outputs from a record player or FM receiver can be fed to two modulators and the output loop placed around the area which will be occupied by the listeners. A tiny integrated receiver is placed in each ear of the listener with the pick-up coils of the two receivers inverted with respect to each other so that they respond to pulses of opposite polarity. Stereo programs played over the system will be heard with excellent separation and in correct phase while the listener moves freely about the area enclosed by the loop. Applications of this system may be applied in the home, on boats, in automobiles, and in airplanes. This system should be especially adaptable to boats and automobiles where it is difficult to find an effective place to mount stereo speakers. On airplanes, it could replace the unwieldy and uncomfortable accoustic tube headsets now in use.

Another application of the present invention is for guidance of personnel or vehicles. For a guidance application, the loop would be modified so that the conductor would form a cable extended along the desired path. Taped voice or tone commands to "bear left" would be repeated continuously on one channel and to "bear right" would be continuously repeated on the other channel so that a person or vehicle could be guided along the cable. When the receiver coil is directly above the cable, there is no output, but deviation of the receiver coil from above the cable to either side immediately results in reception of a signal which indicates the proper corrective action. A switch can be provided on the receiver to invert the loop connections to assure reception of the correct commands regardless of the direction of travel along the cable. A single receiver would be sufficient for manual control using verbal commands. Automatic guidance would require two receivers and tone modulation comprising a "turn" command on one channel only.

A further application of the present invention would be for obstruction warning. A cable would be placed to surround an obstruction to alert a vehicle equipped with the pulse receiver. A taped warning signal would be repeated continuously on the channel heard outside the loop and a command to stop would be repeated continuously on the channel heard inside the loop. A vehicle or person carrying the pulse receiver will detect the warning upon approaching the loop, the signal getting stronger as the receiver gets closer to the loop. When the receiver is positioned directly over the cable, the warning signal disappears but immediately thereafter, on the inside of the loop, the stop signal would be detected at full strength. The signals can be used to activate alarms, stop the vehicle, or simply provide aural warnings.

A further application of the present invention would be to provide communication in a confined area. If only one channel is modulated, and a single receiver is used by each listener, a lecture or instructions can be limited to any desired area. To confine a lecture to a single classroom, for example, the loop would be placed about the periphery of the room and only the channel received within the loop would be modulated. Only those receivers within the room would hear the lecture. An identical receiver in any of the adjacent classrooms would not pick up any signal because the modulated pulses would be of the wrong polarity for that receiver. The second channel could be used for a lecture in an adjacent classroom, if desired, without any mutual interference.

It is therefore an object of the present invention to provide a method and apparatus for providing polarity multiplexing for guidance, warning, education, and entertainment purposes.

It is a further object of the present invention to provide a carrier pulse train which eliminates cross-talk between channels thereby providing a practical application of polarity modulation.

It is still a further object of the present invention to provide a method and apparatus which is simple and economic in structure and to produce.

The means for accomplishing the foregoing objects and other advantages, which will be apparent to those skilled in the art, are set forth in the following specification and claims and are illustrated in the accompanying drawings dealing with basic and alternate embodiments of the present invention. Reference is made now to the drawings in which:

Figures 1, 3:
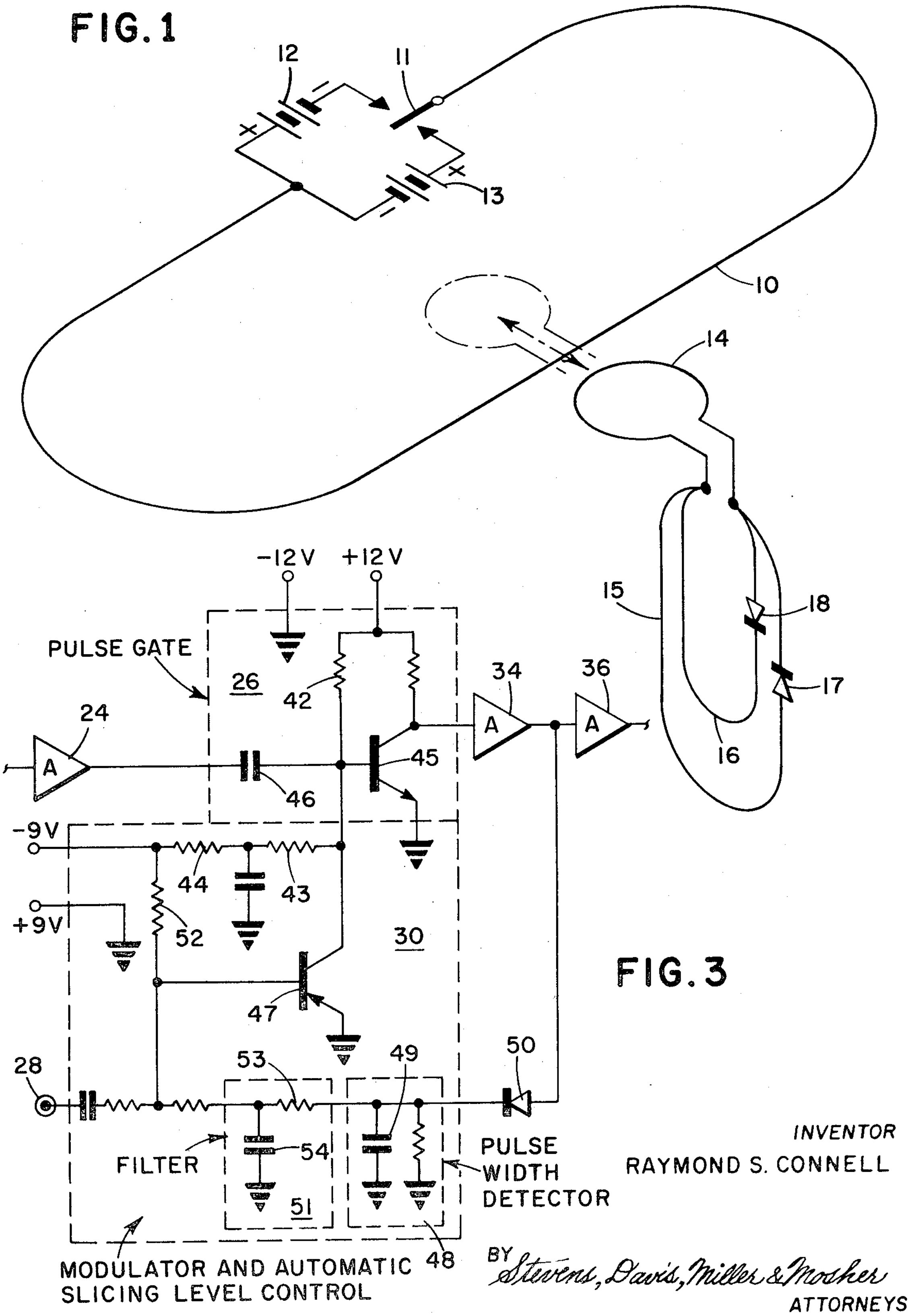
FIG. 1 is a perspective view of a simplified schematic representation of the subject invention showing the transmitter and receiver portion and illustrating the theory upon which the invention operates.
FIG. 3 is a more detailed schematic diagram of a portion of the transmitter of FIG. 2.

Referring now to FIG. 1, a first conductor 10 is formed into a loop including a switch 11 and two direct current power supplies 12 and 13 arranged in parallel but their polarities reversed so that the positioning of the switch 11 will alternately cause current to flow in the clockwise and counterclockwise directions through the first conductor 10. A second conductor 14 or receiver portion, in a plane substantially parallel to the plane of conductor 10, is bridged by two conductors 15 and 16 having rectifiers 17 and 18 connected therein to limit the current flow to a single direction in each of the two conductors 15 and 16. When the switch 11 is closed to cause current flow in conductor 10, a magnetic field will be created about conductor 10 and current flow will be induced into conductor 14. The direction of current flow in conductor 10 and the relative position of the conductors 10 and 14 will determine whether current flows through conductor 15 or 16. The alternate closing of switch 11 will create two separate pulse trains for transmission from the first loop to the second loop. It should also be clear that small variations in the time the switch remains in either position will cause corresponding variations in the length of the pulses in conductors 15 and 16. In other words, the two pulse trains can be independently width modulated, creating two modulated pulse trains separately and solely on the basis of polarity. The pulses can also be amplitude modulated by varying the magnitude of the voltages from the power supplies.

The basis for the invention can therefore be seen to be a combination of pulse polarity multiplexing and magnetic coupling between the sending and receiving loops.

Figures 2, 4:
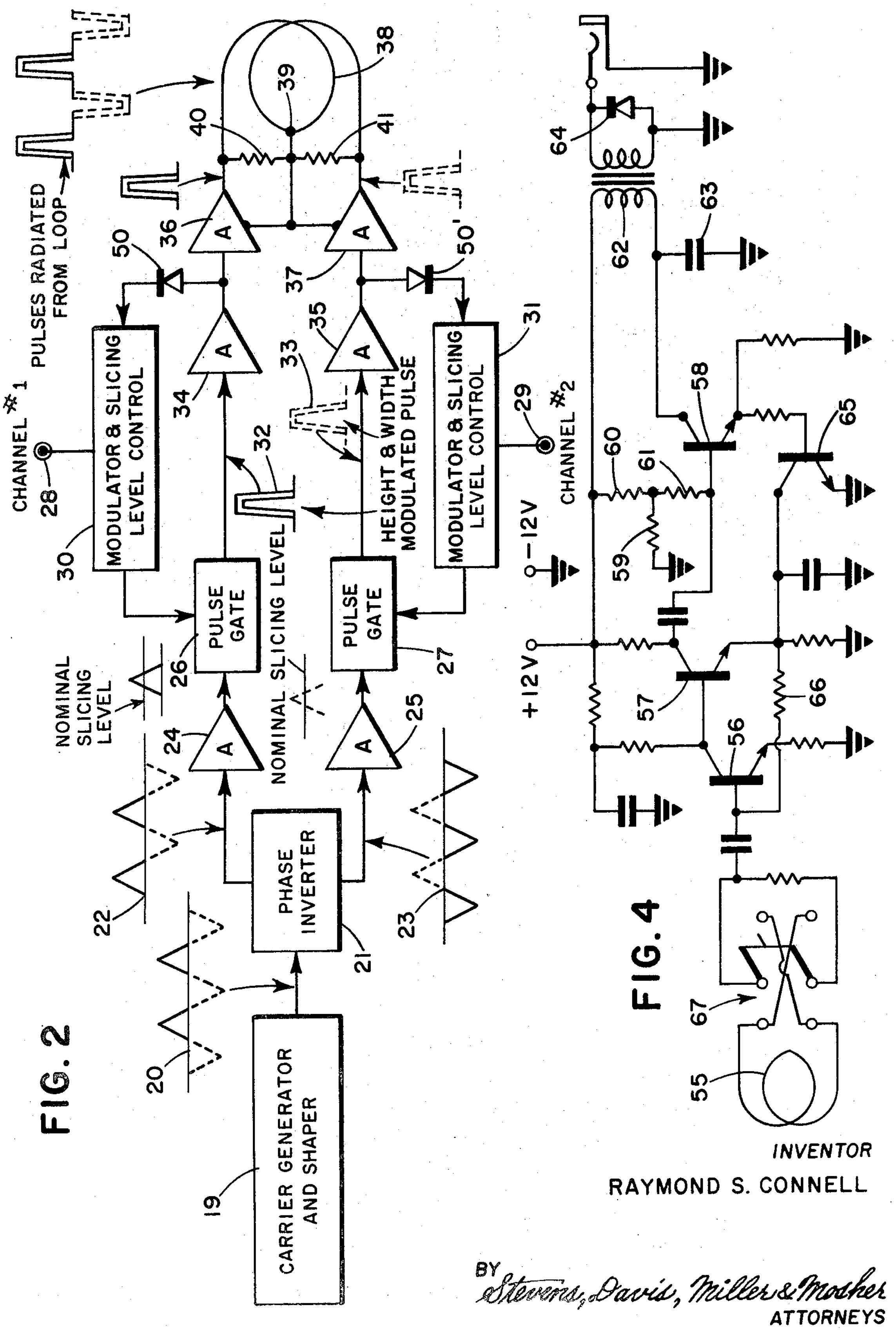
FIG. 2 is a block level schematic diagram of a pulse polarity multiplex transmitter according to the present invention.
FIG. 4 is a schematic of a pulse polarity multiplex receiver, according to the present invention, with only a single channel being shown.

Turning now to FIG. 2, the carrier generator 19 produces a sine wave having a frequency of at least 8kHz. Although not necessary to the operation, the sine wave is preferably shaped to a triangular wave 20. The phase inverter 21 produces two output wave trains 22 and 23 which are inverted with respect to each other as shown. The carrier generator 19 and phase inverter 21 are standard circuits whose details are well known and therefore will not be discussed further. Following the phase inverter 21 are isolating amplifiers 24 and 25. The wave trains in the two channels are an exact replica of the original output from the carrier generator 19 except that one has been inverted so that the portions which were negative-going at the output of the carrier generator are positive-going at the input to the pulse gate 27. The pulse gates 26 and 27 are biased beyond cut-off so that only the tip of the triangular waves causes them to conduct. The signal amplitude at which the pulse gates 26 and 27 conduct will be called the "slicing level". The slicing level for each pulse gate is held constant by an automatic slicing level control to be described later.

Speech, tones, or other wave forms applied to input terminals 28 and 29 of the modulators 30 and 31, respectively, cause momentary variations in the bias on the pulse gates 26 and 27 thereby changing the instantaneous slicing level on the triangular carrier wave form. The result is that the pulse gates 26 and 27 produce output pulses whose height and width vary with modulation. Hence, the two triangular wave trains separated by the phase inverter 21 are converted to two unipolar, independently modulated pulse trains 32 and 33 which are interleaved in time with the same spacing as the negative and positive peaks of the original triangular wave train from the carrier generator 19. Each pulse gate responds only to the peaks of the input waveforms. The pulse gate 26 produces modulated pulses triggered by one polarity from the carrier generator 19 and the other pulse gate 27 produces modulated pulses triggered by the other polarity.

Limiting amplifiers 34 and 35 restrict the maximum height of the pulses while furnishing sufficient drive for the power amplifiers 36 and 37 where the two pulse trains are recombined.

Power amplifiers 36 and 37 and the center tapped loop 38 form a push-pull power output arrangement which causes current to flow in one direction around the loop for pulses driving one power amplifier and in the opposite direction for pulses driving the other power amplifier. It will be noted that the device illustrated in FIG. 2 performs the same function as the device shown in FIG. 1 with the addition of modulating the pulses. The single turn loop of FIG. 1 has been replaced by one loop having two or more turns and a center tap connection 39. However, a loop with no center tap connection might also be used with a different output design. The exact type of output stage is not important to the function of the invention. Resistance loading of the loop by resistors 40 and 41 prevents ringing which could cause cross-talk between channels in the receiver.

FIG. 3 shows the details of the circuitry which produces modulated pulse trains from positive-going pulses by varying the pulse area; i.e. both the height and width of the pulses are varied simultaneously by modulation. The details of the pulse gate 26 and the modulator and slicing level control 30 are shown. It should be noted that the corresponding parts in FIGS. 2 and 3 are identified by the same reference numerals and that the corresponding parts of both channels are identical.

The operation of this device is as follows:

The voltage divider composed of resistors 42, 43 and 44 between the +12 and −9 volt supplies results in a negative voltage at the base of transistor 45. In order for transistor 45 to conduct, the positive waveforms applied to its base through the capacitor 46 must be large enough to drive the base positive. That is, their peaks must be greater than the negative bias. Transistor 47 is a PNP type transistor which will conduct on a negative voltage and is therefore capable of preventing the base of transistor 45 from going negative. With transistor 47 at cut off, the bias from the voltage divider is adjusted to just stop conduction of transistor 45 with full drive. It can be seen that the slicing level of transistor 45 can then be varied over the entire pulse height by varying the conduction of transistor 47. The normal slicing level is held constant in spite of large variations in the triangular carrier wave by voltage fed back to transistor 47 from the output of the amplifier 34. The time constant of the pulse width detector 48 is chosen so that the DC voltage across the capacitor 49 varies with the height and width of pulses coupled to it by the diode 50. The purpose of the diode 50 is to prevent discharge of the timing capacitor through the emitter follower output of the amplifier 34. The DC voltage retained by the timing circuit passes through filter 51 to remove audio frequency variations and is then fed to transistor 47 through isolating resistor 52. The circuit quickly reaches a state of equilibrium because any change in the DC voltage from the timing circuit shifts the slicing level up or down, which widens or reduces the pulses reaching the timing circuit, changing the voltage and returning it to a balanced condition. Modulation from the channel input terminal 28 is also applied to the base of transistor 47, changing the instantaneous slicing level, thereby modulating the pulses produced by the gate 26. The filter 51, formed by the resistor 53 and capacitor 54, prevents the automatic slicing level control from acting fast enough to remove the desired modulation.

FIG. 4 shows a detailed schematic of a pulse polarity multiplex receiver according to the present invention. Pulses of both negative and positive current polarity are induced into pick-up coil 55 by the transmitting loop 38 (FIG. 2). The pulse train is amplified by transistors 56 and 57, and then applied to a pulse separator transistor 58. Transistor 58 is biased beyond its cut-off potential by a combination of automatic bias and fixed bias due to resistors 59, 60, and 61, so that only the positive-going pulses cause conduction. The slicing level on the pulses is set high enough to exclude any overshoot from the negative-going pulse, caused by the inductive kickback from either or both loops. Considerable noise is also eliminated by adjusting the slicing level to an optimum value. A pulse height control, to be described later, restricts the pulse height at the input to the pulse separator in order to prevent overdrive and further reduce cross-talk and noise. Although negative-going pulses are suppressed, they bias the separator further into cut-off and serve to establish a DC or average level which assures proper separation of negative and positive pulses for a wide range of signal input levels. Both polarities are always transmitted even though only one polarity may be received.

The time constant of the output transformer 62 and the capacitor 63 integrate the output pulses from the pulse separator into a saw-toothed waveform whose slope varies with the modulation. A diode 64 across the secondary winding of the audio output transformer completes the demodulation process.

The automatic pulse height control transistor 65 functions as follows: Emitter current of transistor 57 provides forward bias for transistor 56 via the resistor 66. Transistor 65 is connected so that it clamps the emitter of transistor 57 to ground when it conducts fully, thus reducing forward bias on transistor 56 and reducing its gain.

The pulses are coupled to transistor 65 from the emitter of transistor 58 and the amplitude of these pulses control the conduction of transistor 65 so that the DC voltage fed back to transistor 56 is reduced. The gain control thus afforded responds rapidly to changes of signal level, keeping the pulses to the separator at the optimum height for proper separation. The dynamic range over which the receiver works is therefore large enough to allow proper operation whether pickup from the transmitter is extremely high or extremely low.

The receiver shown in FIG. 4 is for a single channel. It makes no difference which channel, since there are no tuned circuits or filters involved in channel selection. Either channel can be received on this receiver merely by turning the loop over mechanically, or by reversing the leads from the pick-up loop by means of, for example, a DPDT switch 67, as shown. For this reason the receiver will detect one channel inside the loop 38 of the transmitter and the other channel when outside the loop 38. The conductor forms the boundary where the receiver switches from one channel to the other.

For certain application, such as stereo reproduction, two receivers are required, each responding to opposite channels. For this purpose, two identical receivers may be used, each having its pick-up coil or loop polarized to receive the desired channel.

Figures 5, 6:
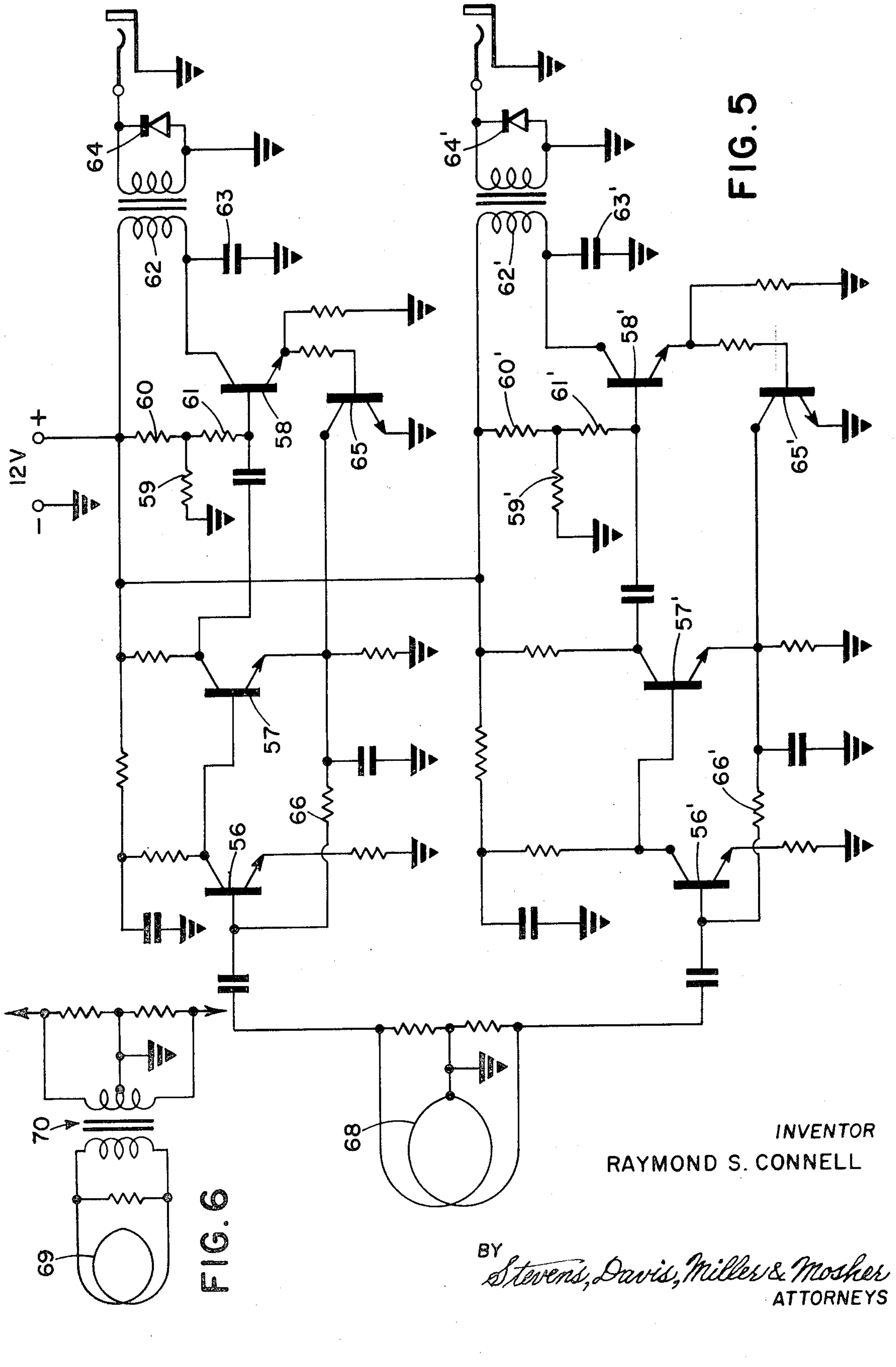
FIG. 5 is an alternate embodiment of a pulse polarity multiplex receiver using a center tapped loop.
FIG. 6 is an alternate embodiment of a receiver loop with the remainder of the receiver being omitted.

FIG. 5 shows an alternate receiver arrangement for receiving both channels and using a center tapped loop 68 instead of two loops 69, as shown in FIG. 6. This arrangement may be used when both channels are to be utilized, and it is desirable to combine the two receivers into one unit as, for example, in a guidance system. The alternate embodiment of FIG. 6 also includes a push-pull impedance matching input transformer 70.

The present invention may be embodied in other specific forms without departing from the spirit or essential characteristics thereof. The present embodiments are therefore to be considered in all respect as illustrative and not restrictive, the scope of the invention being indicated by the appended claims rather than the foregoing description and all changes which come within the meaning and range of equivalency of the claims are therefore to be embraced therein.

What is Claimed

1. A polarity separation multiplex system comprising a transmitter and at least one inductively coupled receiver;

said transmitter comprising means to generate a carrier wave, means connected to said generator and adapted to phase separate said carrier wave into two wave trains inverted with respect to each other, first amplifier means connected to amplify each said wave train, pulse gate means connected to each said amplifier means and adapted to be driven into conduction by each amplified wave train, modulator means connected to each said pulse gate means and adapted to control the level of conduction of said pulse gate by impressing information on said pulse in the form of amplitude and width modulation, second amplifier means connected to the output of each said pulse gate, and a center tapped transmitting loop connected to conduct one modulated pulse train on each half thereof;

each said at least one receiver comprising a conductor formed into a receiving loop, at least one receiving channel connected to said receiving loop and comprising receiver amplifier means connected to said receiving loop, received signal detector means including automatic gain control means connected to said receiver amplifier means, output amplifier means connected to said detector means, and utilization means responsive to the received signals.

2. A polarity separation multiplex system according to claim 1, wherein said receiver comprises two identical receiving channels and said receiving loop comprises a center tapped coil, each of said channels being connected to one half of said center tapped coil.

3. A polarity separation multiplex system according to claim 1, further comprising switch means connected between said receiving loop and receiver amplifier means whereby the connection of said receiving loop can be reversed for reception of either of said pulse trains.

4. A polarity separation multiplex system according to claim 1, further comprising means for converting the carrier wave generated by said carrier generating means into triangular shaped pulses.

5. A polarity separation multiplex system according to claim 1, further comprising automatic pulse height control means.

6. A polarity separation multiplex system according to claim 1, further comprising automatic slicing level control means in each said modulator adapted to adjust for variations in carrier level due to voltage fluctuations thereby assuring generation of modulated pulses.

7. A method for providing guidance information signalling along a predetermined route through the use of a polarity separation multiplex system comprising the steps of:

generating a carrier wave, phase separating said carrier wave into two wave trains inverted with respect to each other, impressing guidance information on at least one of said wave trains in the form of amplitude and width modulation, impressing both said wave trains onto a conductor extending along said route, placing a conductive coil of a receiver relative to said conductor to thereby inductively impress upon said coil said wave trains, and detecting by polarity separation at least one of said impressed wave trains whereby the guidance information on said one wave train will be received.

8. A method according to claim 7, used as a guidance information signalling system and wherein said wave trains are modulated with directional guidance information so that "left" commands are received on one side of the conductor and "right" commands are received on the other side.

9. A method according to claim 7, used as a warning system in which a hazardous obstacle is surrounded by said conductor, said wave trains having "caution" and "stop" signals impressed thereon so that a "caution" signal is received when the conductor is approached and a "stop" signal is received when the conductor is passed over.

10. A method for providing single and dual communication channels within a particular area by means of a polarity separation multiplex system comprising the steps of generating a carrier wave, phase separating said carrier wave into positive and negative wave trains, impressing information on at least one of said wave trains by height and width modulation, and impressing both said wave trains on a single conductor extending along a predetermined path, receiving said information by inductive coupling said wave trains onto receiver means having at least one coil positioned relative to said conductor and at least one receiving channel connected to said coil, and polarity separating the received wave trains and demodulating said pulses in said receiving channels.

11. A method according to claim 10, used for a stereophonic sound system and wherein the step of receiving said information comprises inductively coupling said wave trains onto two receiver means each formed with identical structure but with reversed receiving coils to simultaneously receive both modulated trains.

12. A method according to claim 10, used for a confined area communication system wherein said conductor defines the boundary of the particular area and said receiver is kept within said boundaries.

13. A method according to claim 10 used as a highway advisory information system wherein said conductor extends parallel to and between traffic lanes with lanes on opposite sides of said conductor receiving separate instructions and road information according to the relative position with respect to said conductor.

14. A method according to claim 10, used as a two-way communication system within a sharply delineated area bound by said conductor wherein said conductor acts as both a transmitting and a receiving loop.

15. A method according to claim 10 wherein said conductive coil is a common center tapped coil having a receiving channel connected at each end thereof, each said channel including amplifying and detecting means, both said wave trains being inductively impressed upon said coil, polarity separated and amplified separately by said channels.

16. A method according to claim 15 used as an automatic guidance information system wherein only one of said wave trains is modulated with "turn" information so that said "turn" information is received in one channel for "right turn" when on one side of the conductor and in the other channel for "left turn" when on the other side of the conductor.

17. A polarity separation multiplexing method for transmitting and receiving information over single and dual communication channels comprising the steps of generating a carrier wave, phase separating said carrier wave into two wave trains inverted with respect to each other, impressing said information onto at least one of said wave trains in the form of amplitude and width modulation, and impressing both said wave trains onto a conductor of substantial length, and placing a conductive coil of a receiver in proximity to said conductor whereby said wave trains are impressed on said coil, polarity separating and amplifying at least one of said wave trains impressed on said coil, and demodulating said received pulses.

* * * * *